United States Patent [19]

Hamasaki et al.

[11] Patent Number: 5,446,593
[45] Date of Patent: Aug. 29, 1995

[54] LENS ADVANCING MECHANISM

[75] Inventors: Takuji Hamasaki; Zenichi Okura, both of Tokyo, Japan

[73] Assignee: Asahi Kogaku Kogyo Kabushiki Kaisha, Tokyo, Japan

[21] Appl. No.: 145,171

[22] Filed: Nov. 3, 1993

[30] Foreign Application Priority Data

Nov. 5, 1992 [JP] Japan .................. 4-295484

[51] Int. Cl.6 .............................. G02B 7/02
[52] U.S. Cl. .................... 359/704; 359/699; 359/700; 359/826
[58] Field of Search ........... 359/700, 694, 703, 704, 359/706, 822, 825, 826, 829, 830

[56] References Cited

U.S. PATENT DOCUMENTS

| | | | |
|---|---|---|---|
| 4,346,967 | 8/1982 | Komoto et al. | 350/430 |
| 4,387,968 | 6/1983 | Sekiguchi | 350/429 |
| 4,564,264 | 1/1986 | Komoto | 350/255 |
| 4,764,783 | 8/1988 | Tanaka | 354/195.1 |
| 4,948,227 | 8/1990 | Takeyasu | 350/255 |
| 4,993,815 | 2/1991 | Yamazaki et al. | 350/429 |
| 5,043,752 | 8/1991 | Kohmoto | 354/195.12 |
| 5,164,757 | 11/1992 | Nomura | 354/403 |
| 5,164,860 | 11/1992 | Suzuki et al. | 359/696 |
| 5,191,482 | 3/1993 | Sekiguchi | 359/819 |
| 5,223,980 | 6/1993 | Hamasaki | 359/694 |
| 5,231,449 | 6/1993 | Nomura | 354/485 |
| 5,245,476 | 9/1993 | Shono | 359/699 |
| 5,255,124 | 10/1993 | Iwamura | 359/694 |
| 5,262,898 | 11/1993 | Nomura | 359/700 |

FOREIGN PATENT DOCUMENTS 63-83712  4/1988  Japan .
2220014  9/1990  Japan .

Primary Examiner—Georgia Y. Epps
Assistant Examiner—Ricky Mack
Attorney, Agent, or Firm—Sandler, Greenblum & Bernstein

[57] ABSTRACT

A lens advancing mechanism which includes a stationary barrel having a linear guide groove arranged parallel to an optical axis, a ring rotatably coupled on the outer circumferential surface of the fixed barrel and a lens supporting member having a guide portion which is received in the linear guide groove. The ring has at least one lead groove formed on its inner surface and the guide portion has at least one protrusion which is received in the lead groove of the ring. When the ring is rotated, the lens supporting member is moved along the linear guide groove.

14 Claims, 5 Drawing Sheets 5,446,593

LENS ADVANCING MECHANISM

BACKGROUND OF THE INVENTION

The present invention relates to a lens advancing mechanism, and more particularly to a mechanism used to effect a telescoping operation of a zoom lens barrel.

Generally, in a zoom lens barrel, at least a pair of front and rear movable lens groups are moved along an optical axis on a predetermined locus in order to vary a focal length of the lens. The movable lens groups are normally guided along a linear path by using a guiding mechanism. Movement of the lens groups is accomplished by the action of a cam mechanism that is connected to an outside rotatable ring. Thus, by rotating the outside ring, the cam mechanism moves the lens groups along the linear path, as defined by the guiding mechanism, and thus a zooming operation is effected.

In the conventional lens, however, the guiding mechanism and the cam mechanism are provided separately, thus complicating the structure of the lens. This is illustrated in U.S. Pat. No. 4,993,815 and Japanese Patent Publication SHO 63-83712. This makes it difficult to manufacture the lens using resin material.

SUMMARY OF THE INVENTION

It is therefore an object of the present invention to provide a lens advancing mechanism capable of simplifying the structure of a lens barrel. In particular, to simplify the structure of the cam mechanism so as to make it possible to fabricate the lens from resin materials using molding techniques.

For this purpose, according to the present invention, there is provided a lens advancing mechanism comprising:

- a stationary barrel provided with a linear guide groove arranged parallel to an optical axis;
- a ring member rotatably coupled on an outer circumferential surface of said stationary barrel, an inner surface of said ring member having at least one lead groove formed therein; and
- a lens supporting member having a guide portion to be received in said linear guide groove, an outer surface of said guide portion having at least one protruding member to be slidably received in said lead groove of said ring member, wherein said lens supporting member moves along said optical axis when said ring member is rotated.

DESCRIPTION OF THE ACCOMPANYING DRAWINGS

DESCRIPTION OF THE EMBODIMENTS

FIGS. 1 through 5 illustrate a lens barrel 10 of an interchangeable lens unit adapted to be attached to a single-lens-reflex camera, and which embodies the invention.

Figure 1:
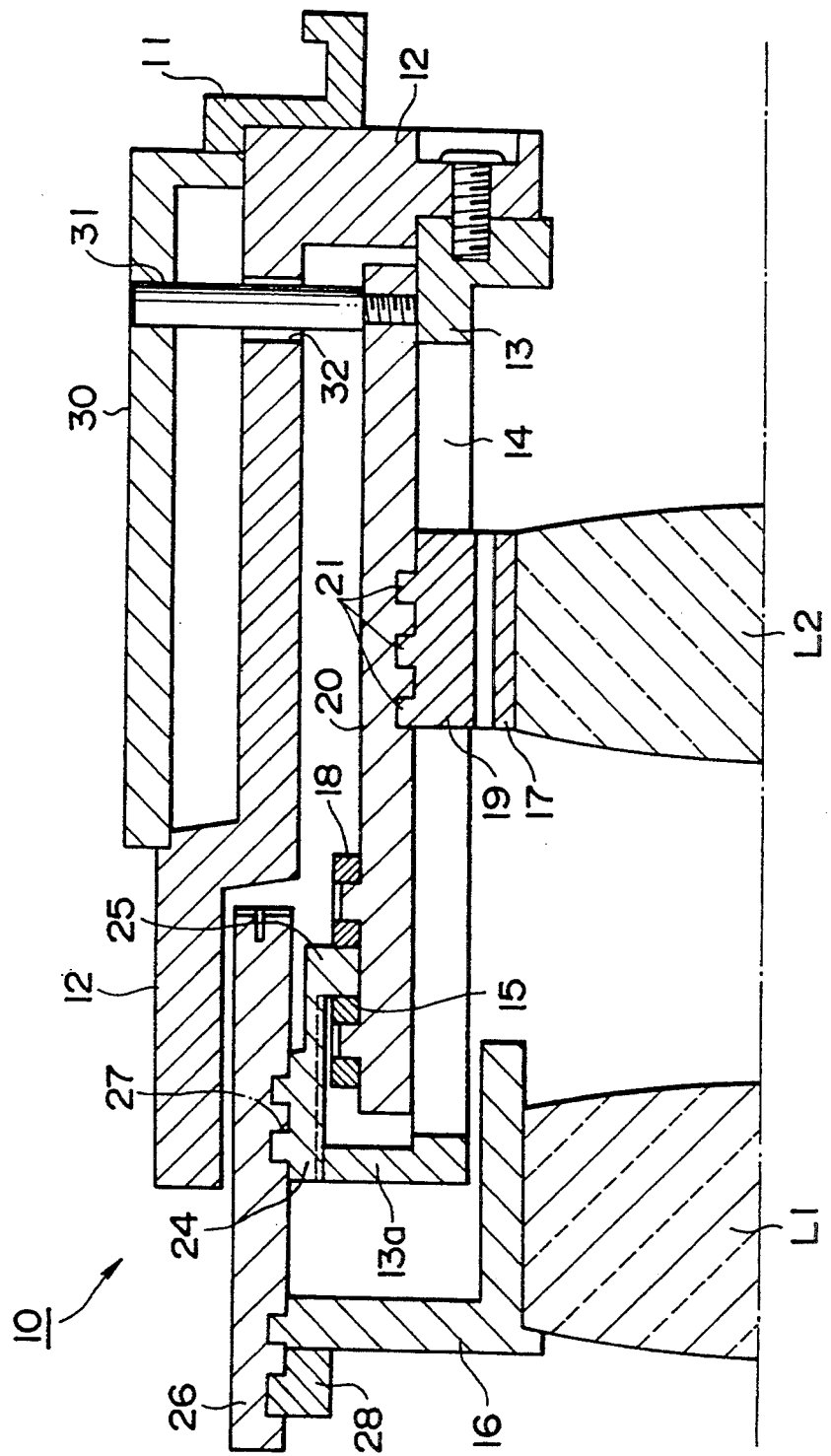
FIG. 1 is an upper-half sectional view of a zoom lens barrel embodying the present invention.

FIG. 1 shows an outer fixed barrel 12 and a linear guide barrel 13 that are secured to a mount member 11. On the linear guide barrel 13, a linear guide groove 14 is formed in parallel with the optical axis. From a rear group frame 17 which supports a rear group lens L2, a linear guide 19 protrudes such that it slides in the linear guide groove 14.

A cam ring 20 rotates about the outer circumferential surface of the linear guide barrel 13. The front outer-surface of the cam ring 20 has a front group moving barrel 24 rotatably fitted thereon. An arc-shaped guided portion 25 (see FIG. 5) protrudes from the front group moving barrel 24 and is fitted between a pair of cam rollers 15 and 18. Helicoid grooves 22 (see FIG. 2) which are formed on the inner circumferential surface of the cam ring 20 mesh with the helicoid members 21 formed on the outer circumferential surface 19a of the linear guide 19 of the rear group frame 17. The helicoid members 21 of the linear guide 19 protrude out of the linear guide groove 14 to mesh with the helicoid grooves 22 of the cam ring 20 when the rear group frame 17 is installed.

Further, on the outer circumferential surface of the front movable barrel 24 a focusing ring 26 is threaded by a meshed portion 27. The front group frame 16 is secured to the focusing ring 26 through a holding ring 28. At the front portion of the linear guide barrel 13, a support member 13a protrudes out and supports the front group movable barrel 24 such that the barrel 24 slides in the optical axial direction.

A zoom ring 30 which can be rotated by an external source (i.e., by the photographer) is mounted on the outer circumferential surface of the outer stationary barrel 12. The zoom ring 30 and the cam ring 20 are coupled to each other by a connecting pin 31 which extends in the radial direction, so that the rings 20 and 30 rotate as a unit. The connecting pin 31 passes through a circumferentially extending slit 32 in the outer stationary barrel 12.

For the lens advancing mechanism having the above constitution, when the zoom ring 30 is rotated, the cam ring 20 is rotated simultaneously by means of the connecting pin 31. Then, the rear group frame 17, (i.e., the rear lens group L2), is moved along the optical axis by means of the meshed helicoid members 21 and helicoid grooves 22. Further, the cam rollers 15 and 18 rotate along the arcuate side surfaces of the guided portion 25, respectively. Accordingly, the guided portion 25, and therefore the front group movable barrel 24 (i.e., the focusing ring 26, the front group 16 and the front lens group L1) is moved along the optical axis while maintaining a predetermined positional relationship with respect to the rear lens group L2. Thus, the lens is advanced and the zooming operation is executed.

When only the focusing ring 26 is rotated, only the front group frame 16, (i.e., the front lens group L1) is moved along the optical axis by means of the meshed portion 27, thereby changing the positional relationship between the front and rear lens groups. Thus the focusing operation is executed.

According to the present invention, the use of helicoid members 21 in the linear guide 19 interlocked with the helicoid grooves of the cam ring 20, results in a simplified construction. Thus it becomes easier to fabricate the lens using resin materials and molding techniques. Further the wider and longer helicoid grooves and members ensure that accuracy is maintained while the lens advancing function is being executed. Thus, the precision of the cam ring 20 is increased and advancement of the lens advancing is smoothly executed thereby improving the optical performance of the lens barrel 10.

Figure 6:
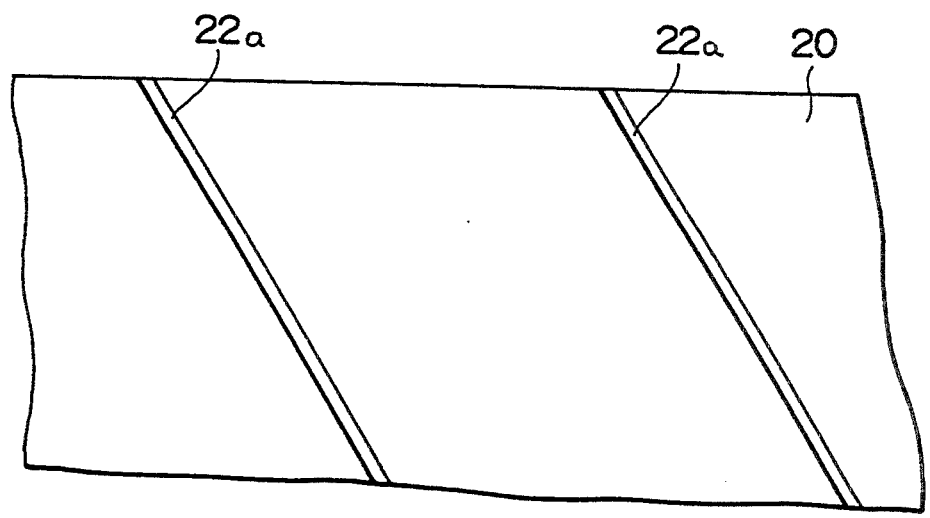
FIG. 6 shows a lead groove of the inner circumferential surface of the cam ring in a modified embodiment.
Figure 7:
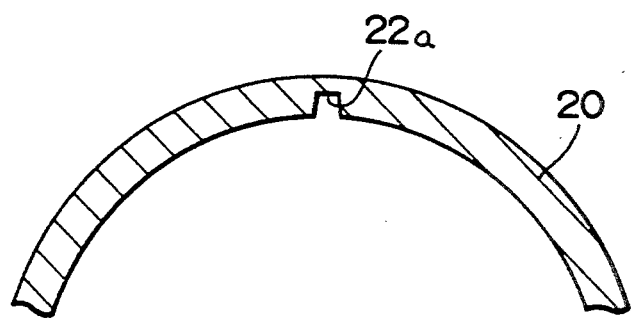
FIG. 7 is a partly-cut vertical sectional view showing the cam ring in the modified embodiment.
Figure 8:
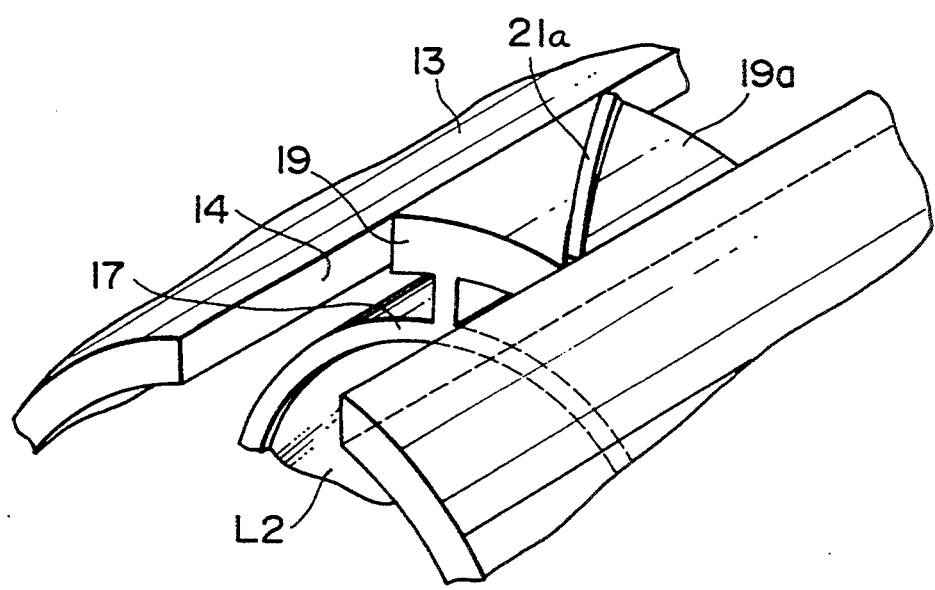
FIG. 8 is an enlarged perspective view showing a linear guide of a rear group lens fitted into the linear guide groove of the cam ring in the modified embodiment.

FIGS. 6 through 8 illustrate a modified interchangeable zoom lens barrel according to another embodiment of the present invention. In this modified embodiment, the helicoid members 21 and helicoid grooves 22, each of which comprises three (3) lines in the first embodiment, are replaced with a protruding member 21a and a lead groove 22a, respectively. With this modified constitution, a division of the die can be formed along the single protruding member 21a when molding the linear guide 19 by injection molding etc. Accordingly, a die may comprise only a pair of upper and lower parts, and the cutting of the die is therefore much easier. The lead groove 22a of the cam ring 20 also comprises a single line, which further facilitates the cutting of the die in the case that the cam ring 20 is also molded with a die.

Figure 2:
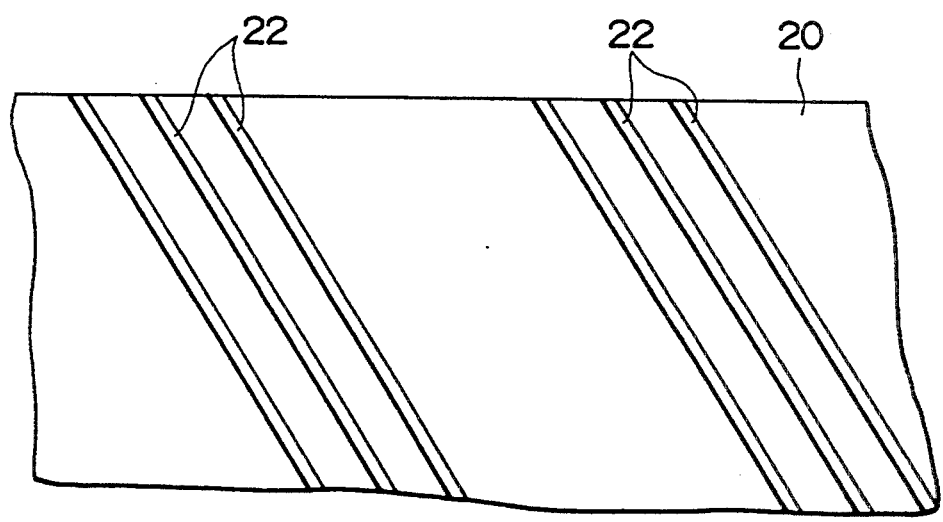
FIG. 2 shows helicoid grooves of the inner circumferential surface of a cam ring.
Figure 3:
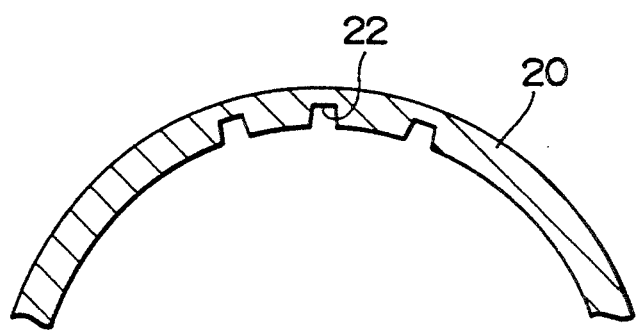
FIG. 3 is a partly-cut vertical sectional view showing a cam ring.
Figure 4:
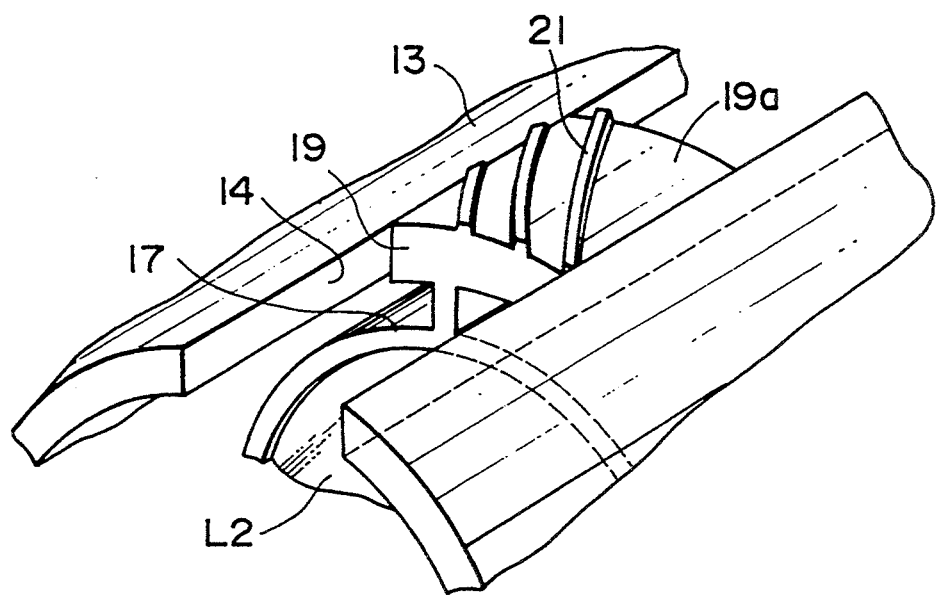
FIG. 4 is an enlarged perspective view showing a linear guide of a rear group lens fitted into the linear guide groove of the cam ring.
Figure 5:
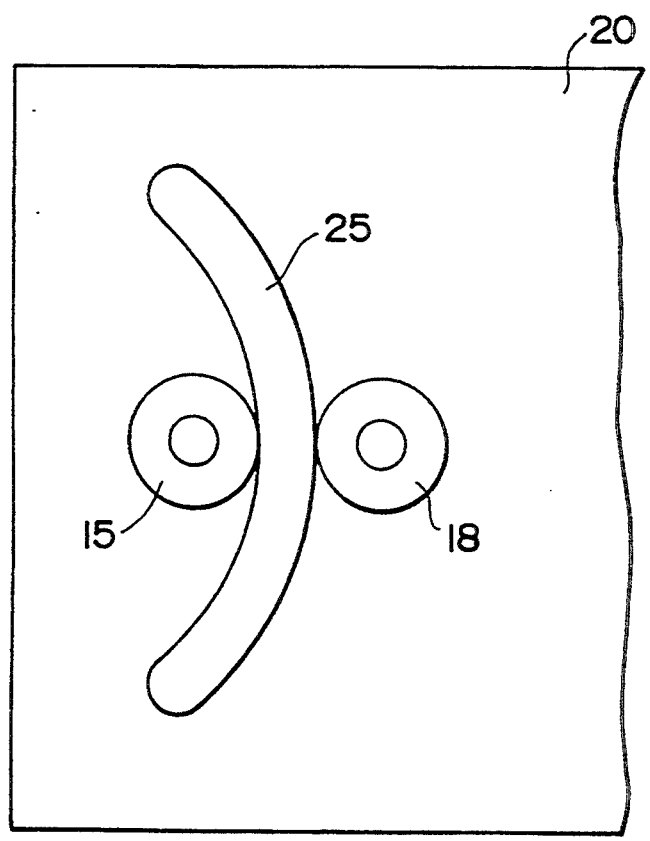
FIG. 5 is a plan view showing an arc-shaped guided portion inserted between guide rollers provided at the front end portion of the cam ring.

The number of the lines of the helicoid members 21 and helicoid grooves 22 is not restricted to three or one as described above. Two, or more than three lines may be employed. Although only one linear guide groove is shown, two or more may be used. Further the number of helicoid members and grooves may be different on each linear guide groove and the corresponding portion of the cam ring that meshes with the guide groove. The use of two guide grooves is preferable since this offers more stability and precise movement than a single guide groove, but is easier to manufacture than a lens having more than two guide grooves. FIGS. 2 and 6 show two sets of guide grooves, each set located on the inner surface of the cam ring at diametrically opposite ends.

The above descriptions are directed to a lens advancing mechanism used in an interchangeable zoom lens barrel, however, the present invention may be applied to any type of lens barrels wherein the position of the optical system along the optical axis varies depending upon the position of the rotatable cam ring. Further, the present invention may be applied to a single focal length lens and used to adjust the focus of the lens.

Thus, the present invention may be applied to any type of cameras such as compact camera, an electronic still camera and others that have a zoom lens. Further the present invention may be applied to any telescoping lens barrel system where there is a need for moving the optical system along the optical axis.

The present disclosure relates to subject matters contained in Japanese Patent Application No. HEI 4-295484 (filed on Nov. 5, 1992) which is expressly incorporated in its entirety by its reference herein.

What is claimed is:

1. A lens advancing mechanism comprising:
    a stationary barrel provided with a linear guide groove arranged parallel to an optical axis;
    a ring member rotatably coupled on an outer circumferential surface of said stationary barrel, an inner surface of said ring member having at least one lead groove formed therein; and
    a lens supporting member having a guide portion to be received in said linear guide groove, an outer surface of said guide portion having at least one protruding member to be slidably received in said lead groove of said ring member, wherein said lens supporting member moves along said optical axis when said ring member is rotated, and wherein said at least one lead groove comprises at least one helicoid groove, while said at least one protruding member comprises at least one helicoid member to be meshed with said at least one helicoid groove.

2. The mechanism according to claim 1 wherein said lens supporting member comprises a cylindrical lens frame which supports a lens group.

3. The mechanism according to claim 1, wherein a pair of said guide portions are formed at diametrically opposite positions of said lens supporting member.

4. The mechanism according to claim 3, wherein a pair of said lead grooves are formed at diametrically opposite positions of said ring member.

5. The mechanism according to claim 1, wherein said lens supporting member, said guide portion and said protruding member provided on said guide portion are integrally molded.

6. The mechanism according to claim 1, wherein said guide portion has a substantially square shape.

7. The mechanism according to claim 1, wherein said stationary barrel, said ring member and said lens supporting member constitute a zoom lens unit.

8. A lens advancing mechanism comprising:
    a stationary barrel provided with a linear guide groove arranged parallel to an optical axis;
    a ring member rotatably coupled on an outer circumferential surface of said stationary barrel, an inner surface of said ring member having at least one lead groove formed therein; and
    a lens supporting member having a guide portion to be received in said linear guide groove, an outer surface of said guide portion having at least one protruding member to be slidably received in said lead groove of said ring member, wherein said lens supporting member moves along said optical axis when said ring member is rotated, and wherein said at least one lead groove comprises two helicoid grooves, while said at least one protruding member comprises two helicoid members which mesh with said two helicoid grooves.

9. The mechanism according to claim 8, wherein said lens supporting member comprises a cylindrical lens frame which supports a lens group.

10. The mechanism according to claim 8, wherein said two helicoid members are formed at diametrically opposite positions of said lens supporting member.

11. The mechanism according to claim 10, wherein said two helicoid grooves are formed at diametrically opposite positions of said ring member.

12. The mechanism according to claim 8, wherein said lens supporting member, said guide portion and said protruding member provided on said guide portion are integrally molded.

13. The mechanism according to claim 8, wherein each said protruding member has a substantially square cross-sectional shape.

14. The mechanism according to claim 8, wherein said stationary barrel, said ring member and said lens supporting member constitute a zoom lens unit.

* * * * *

UNITED STATES PATENT AND TRADEMARK OFFICE
CERTIFICATE OF CORRECTION

PATENT NO. : 5,446,593
DATED : August 29, 1995
INVENTOR(S) : T. HAMASAKI et al.

It is certified that error appears in the above-indentified patent and that said Letters Patent is hereby corrected as shown below:

On the cover, in section [56], "References Cited", "U.S. PATENT DOCUMENTS", line 13, change "6/1993" to ---7/1993---.

Signed and Sealed this

Twenty-ninth Day of October 1996

*Attest:*

BRUCE LEHMAN

*Attesting Officer*     *Commissioner of Patents and Trademarks*